US006805187B2

(12) United States Patent
Padiak et al.

(10) Patent No.: US 6,805,187 B2
(45) Date of Patent: *Oct. 19, 2004

(54) SECURITY COVER

(75) Inventors: Scott Padiak, Winnetka, IL (US);
Thomas M. Conway, Park Ridge, IL (US); Christopher Dominic, Westchester, IL (US)

(73) Assignee: Cormark, Inc., Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/280,323

(22) Filed: Oct. 25, 2002

(65) Prior Publication Data
US 2003/0230388 A1 Dec. 18, 2003

Related U.S. Application Data

(60) Provisional application No. 60/388,585, filed on Jun. 13, 2002.

(51) Int. Cl.[7] ................................................. A47H 1/00
(52) U.S. Cl. ..................... 160/330; 160/84.06; 160/214
(58) Field of Search ........................... 160/84.01, 84.06, 160/133, 207, 214, 285, 330, 172 R

(56) References Cited

U.S. PATENT DOCUMENTS

| 685,630 | A | | 10/1901 | Nichols | |
|---|---|---|---|---|---|
| 1,337,315 | A | | 4/1920 | Harvey | |
| 1,830,510 | A | | 11/1931 | Giesecke et al. | |
| 3,226,173 | A | | 12/1965 | Bettuzzi | |
| 3,878,879 | A | * | 4/1975 | Manns | 160/273.1 |
| 4,557,309 | A | * | 12/1985 | Judkins | 160/84.06 |
| 4,762,159 | A | * | 8/1988 | Ford | 160/84.06 |
| 4,770,224 | A | * | 9/1988 | Dubbelman | 160/331 |
| 4,829,688 | A | | 5/1989 | Mouraret et al. | |
| 5,082,043 | A | * | 1/1992 | Moreno | 160/90 |
| 5,533,559 | A | * | 7/1996 | Judkins | 160/84.06 |
| 5,823,610 | A | * | 10/1998 | Ryan et al. | 296/180.4 |
| 5,923,313 | A | | 7/1999 | Black et al. | |
| 5,941,001 | A | | 8/1999 | Dietrich et al. | |
| 6,055,754 | A | | 5/2000 | Melhuus | |
| 6,082,433 | A | * | 7/2000 | Vafaie et al. | 160/310 |
| 6,168,291 | B1 | * | 1/2001 | Rockey et al. | 362/278 |
| 6,591,528 | B2 | | 7/2003 | Ellingsen | |
| 6,634,610 | B1 | | 10/2003 | Ricci et al. | |
| 2003/0089461 | A1 | * | 5/2003 | Dondlinger | 160/84.06 |
| 2004/0006904 | A1 | | 1/2004 | Hildenbrand | |

FOREIGN PATENT DOCUMENTS

| CH | 483339 A | * | 12/1975 | B66C/15/00 |
|---|---|---|---|---|
| EP | 314967 A2 | * | 5/1989 | E06B/9/20 |
| EP | 1013870 A2 | * | 6/2000 | E06B/9/13 |

* cited by examiner

Primary Examiner—Bruce A. Lev
(74) Attorney, Agent, or Firm—Welsh & Katz, Ltd.

(57) ABSTRACT

A cover can be moved easily for access behind where the cover had been, and easily restored to its original position, without having to unattach and reattach the cover. In one example, cable guides and an edge of a coupled net can be moved in a vertical direction to allow access to shelving without disconnecting them from the shelving structure, and can be moved in the opposite direction to the original position. The cable guides can direct two cables between opposing sides of the shelving structure in that example.

26 Claims, 4 Drawing Sheets

SECURITY COVER

This application claims the benefit of the filing date of provisional application Ser. No. 60/388,585 which was filed on Jun. 13, 2002.

This invention pertains to a cover such as a security net. For example, the cover can protect against products falling off of shelves, such as in warehouse type stores when the products are accidently pushed by a forklift in the next aisle. In some embodiments, this cover does not require unattaching the cover for access to the shelf behind the cover, or re-attaching the cover after access to the shelf.

BRIEF DESCRIPTION OF THE DRAWINGS

The components in the figures are not necessarily to scale.

FIG. 8b is a sketch of a cut-away top view of the embodiment of FIG. 8a.

DETAILED DESCRIPTION OF SOME EMBODIMENTS

Figure 1:
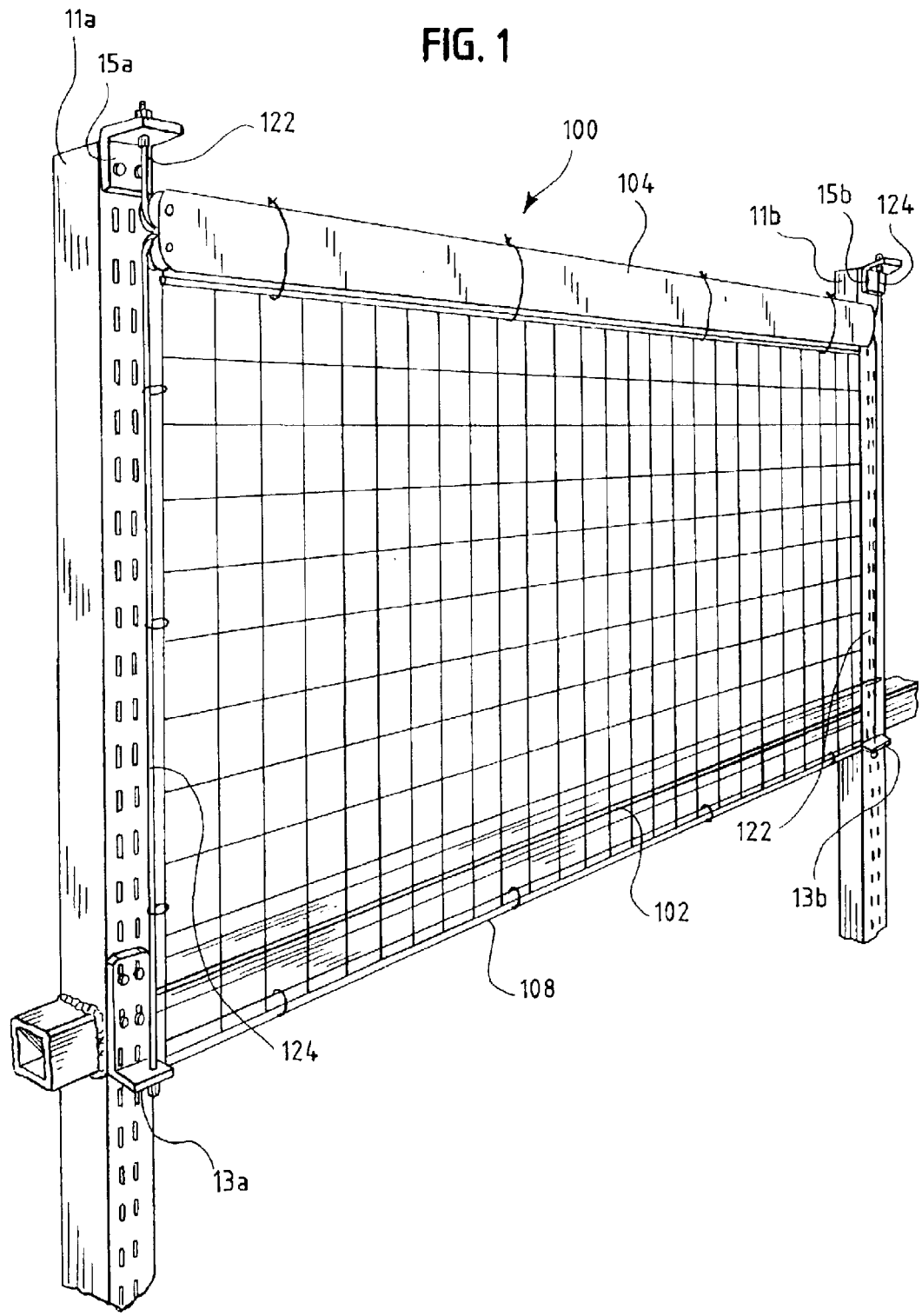
FIG. 1 is a perspective view of one embodiment of the invention shown in one simulated environment.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated.

In the embodiment shown in FIG. 1, a cover assembly 100 is mounted on two upright beams 11a and 11b such as might be used in supporting shelves. In this embodiment, the cover assembly 100 comprises a net 102. The net 102 may be any net as is known in the art. Typically, a commercially available net is an open-meshed fabric which is twisted, knotted, or woven together at regular intervals. The dimensions of the net 102 can be chosen to fit the desired application.

While a net is advantageous because it is strong, durable, and flexible, while permitting a view of what is behind the net, alternative covers can be used. For example, various sheet-like fabrics, plastics, or other materials can be used. If a sheet-like cover is used, grommets can be incorporated into the cover in a number of locations as one way to facilitate attaching the cover to other components of the cover assembly 100.

In the embodiment shown in FIG. 1, the cover assembly 100 comprises a bar 104, and the net 102 is shown attached to the bar 104 at several spaced-apart points along the bar 104. While a bar is not necessary in every embodiment, the rigidity of bar 104 facilitates the even lowering of the top of the net 102. The bar 104 comprises a hollow tube in the embodiment of FIG. 1. This allows other components (discussed below) of the cover assembly 100 to be located at least in part within the bar 104. However, these other components could, for example, extend along the outside of a bar which was not a hollow tube.

In the embodiment shown in FIG. 1, the bottom of net 102 is shown attached to a lateral cable 108 at several spaced-apart points along the lateral cable 108. The two ends of the lateral cable 108 are shown attached to lower brackets 13a and 13b, respectively, which are attached to upright beams 11a and 11b, respectively. The lateral cable 108 facilitates keeping the bottom of the net 102 stretched and secured where that is desired. In other embodiments, the lateral cable 108 need not be used. For example, the bottom of the cover could be left unattached, or could be secured to a shelf or to a horizontal beam.

In the embodiment shown in FIG. 1, the cover assembly 100 comprises cables 122 and 124. One end of cable 122 is attached to an upper bracket 15a which is attached to upright beam 11a. Cable 122 extends through the hollow interior of the bar 104 and then down along upright beam 11b. The other end of cable 122 is attached to lower bracket 13b. Similarly, one end of cable 124 is attached to an upper bracket 15b which is attached to upright beam 11b. Cable 124 extends through the hollow interior of the bar 104 and then down along upright beam 11a. The other end of cable 124 is attached to lower bracket 13a.

In the embodiment shown in FIG. 1, the sides of net 102 are periodically and slidingly clipped to cables 122 and 124. In other embodiments, the sides of the cover could, for example, be left unattached or could be attached to another component.

Figure 2:
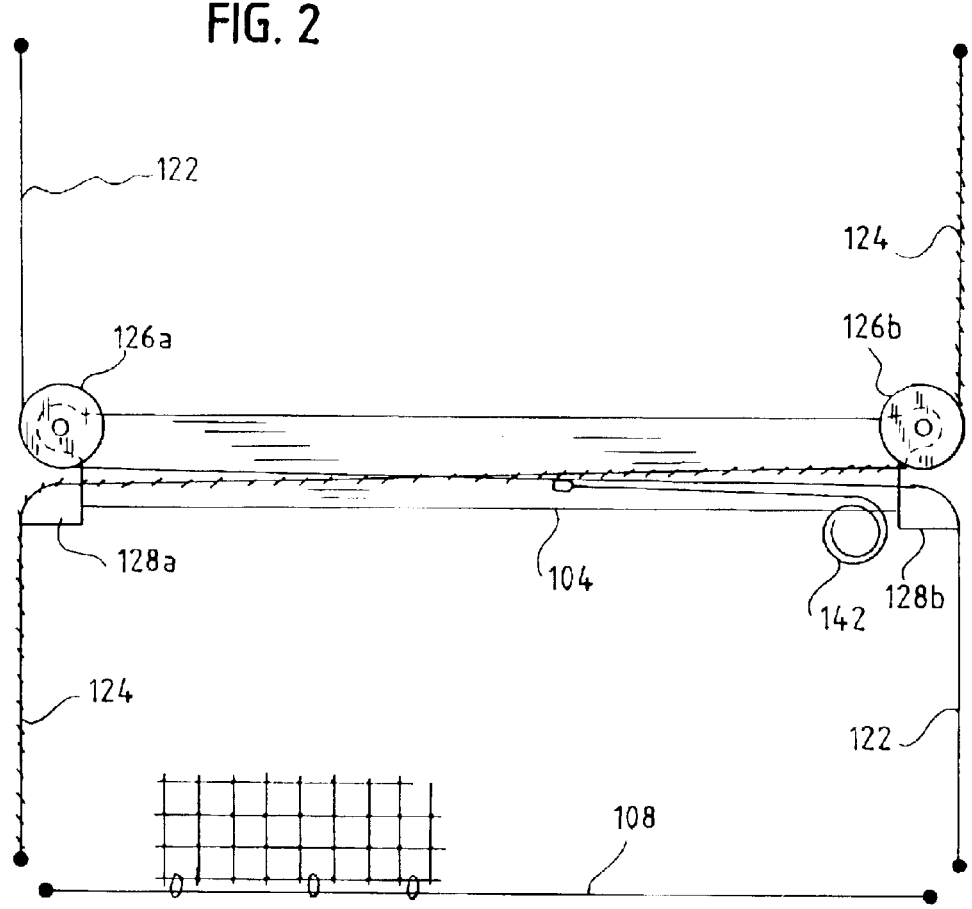
FIG. 2 is a sketch illustrating operation of the embodiment shown in FIG. 1.

As seen in FIG. 2, the bar 104 can include pullies 126a and 126b and fixed guides 128a and 128b near the ends of bar 104, to help guide cables 122 and 124. The pullies 126a and 126b and fixed guides 128a and 128b need not be present in other embodiments or can be present in different combinations. For example, there could be just one pully at each end of bar 104 without a guide for the other cable at that end, there could be just one fixed guide at each end of bar 104 without a pulley for the other cable at that end, there could be two fixed guides at each end of bar 104, and there could be two pullies at each end of bar 104, etc.

In the embodiment demonstrated in FIG. 2, spring 142 is attached to bar 104, with an outer end of the spring fixed to one of the cables (cable 122 in the example of FIG. 2). For example, spring 142 can be a constant force spring, with a coil of the spring mounted on bar 104 so that it can turn freely on its axis and so that it can extend its length parallel to bar 104. For example, spring 142 can be a tight coil of flat steel spring stock wound around a shaft.

As bar 104 is moved down, cables 122 and 124 move through bar 104. As a result, more of each of cables 122 and 124 extends above bar 104 along upright beam 11a or 11b, respectively, and correspondingly less of each of cables 122 and 124 remains below bar 104 along upright beam 11b or 11a, respectively. As this occurs, the coil of spring 142 unwinds as the end of spring 142 (which is attached to cable 122) is pulled through bar 104. Spring 142 presents a constant restoring force to pull cable 122 back through bar 104, raising bar 104 and attached net 102 back up when bar 104 is no longer being held down. This arrangement keeps the bar generally horizontal as it is lowered or raised.

While FIG. 2 shows a single spring 142 attached to one of the two cables 122 and 124, there could be more than one spring in other embodiments, and springs could be attached to both cables in other embodiments. Furthermore, there are many types of springs known in the art, and spring 142 is not limited to springs described above.

Figure 5:
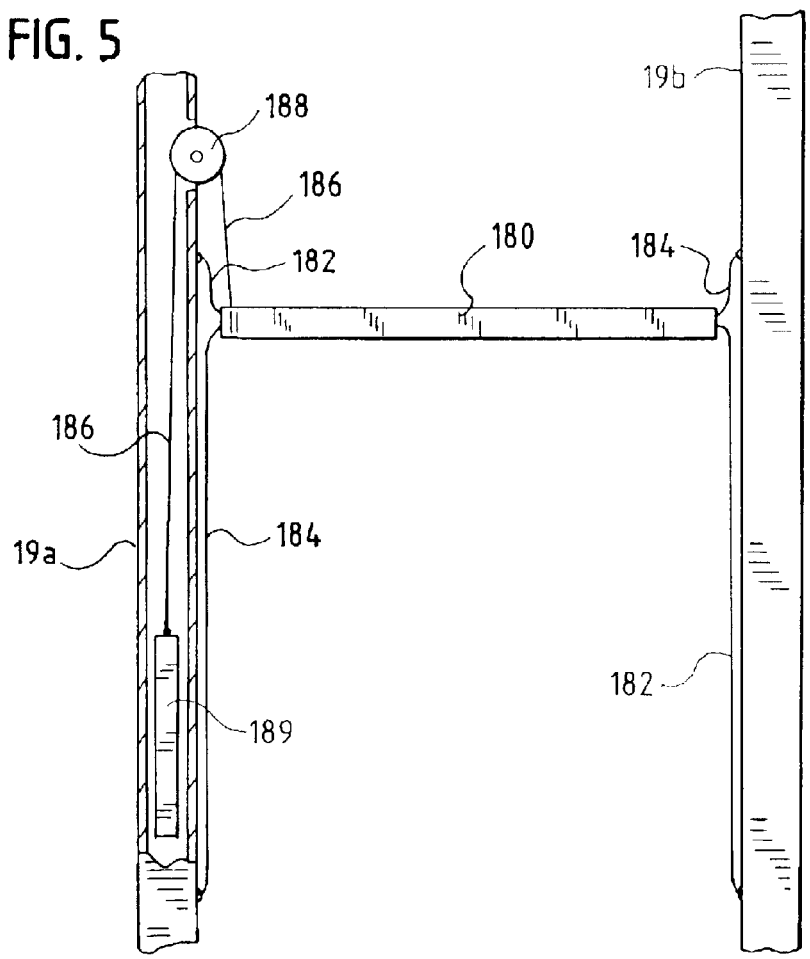
FIG. 5 is a sketch illustrating operation of another embodiment in one simulated environment.

In addition, the restoring-force mechanism need not be a spring in other embodiments. For example, the restoring-force mechanism could be one or more counterweights. The operation of one example is illustrated in FIG. 5. As in the embodiment of FIG. 1, in the FIG. 5 embodiment a bar 180 is suspended between two upright beams 19a and 19b. As in the embodiment of FIG. 1, a cover (not shown) could be attached to bar 180.

As in the embodiment of FIG. 1, cables 182 and 184 keep the bar 180 generally horizontal. One end of cable 182 is attached to upright beam 19a. Cable 182 extends through bar 180 and then down along upright beam 19b. The other end of cable 182 is attached to upright beam 19b. Similarly, one end of cable 184 is attached to upright beam 19b. Cable 184 extends through bar 180 and then down along upright beam 19a. The other end of cable 184 is attached to upright beam 19a.

However, the restoring force in the embodiment of FIG. 5 is supplied by a counterweight 189, which is connected to bar 180 by a cable 186 which rotates over a pulley 188. In the embodiment of FIG. 5, counterweight 189 is shown traveling inside of upright beam 19a.

In other embodiments, counterweight 189 could travel elsewhere, such as adjacent to upright beam 19a as one example. In different embodiments, there could be more than one counterweight, possibly in different locations. As other examples, there could be a combination of restoring-force mechanisms such as a spring and a counterweight. As another example, a counterweight could be weighted to balance the cover assembly when the bar is in any position rather than to automatically restore it to an original position.

Furthermore, while cable 186 is shown rotating over a pulley 188 in FIG. 5, other embodiments need not have a pulley, or can have a substitute component. For example, there could be a fixed guide, or even a more complicated block and tackle.

Figure 3:
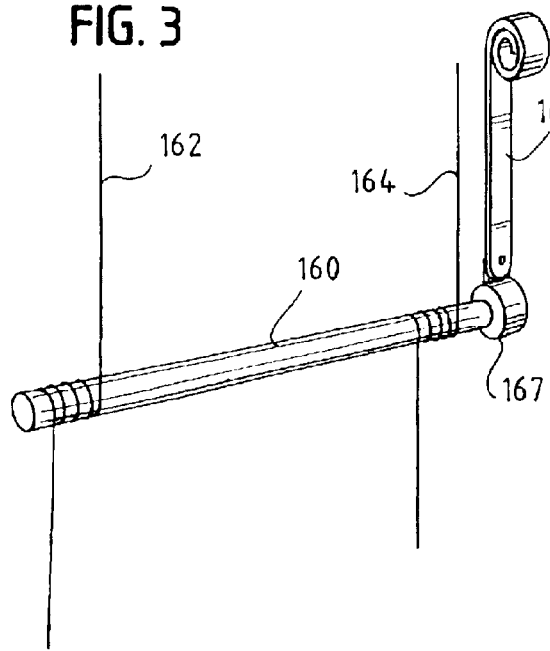
FIG. 3 is a sketch illustrating operation of an alternative embodiment.

FIG. 3 illustrates operation of an another alternative embodiment. As in the embodiment of FIG. 1, a cover (not shown) could be attached to bar 160. However, instead of controlling the bar with cables extending through or along the bar, cables 162 and 164 wrap around their respective ends of bar 160. Cable 162 can extend both above and below bar 160 at only one end of bar 160. Similarly, cable 164 can extend both above and below bar 160 at the other end of bar 160. The ends of the cables 162 and 164 can be attached to fixed components (not shown) such as upright beams. In other embodiments, there could be a different number of cables, and/or one or both ends of bar 160 could ride in a track(s), possibly with locking mechanisms to maintain the bar 160 at desired positions.

In the embodiment of FIG. 3, spring 166 is used for restoring bar 160 (and an attached cover not shown) to its original position after the bar 160 is moved down. Spring 166 is a constant force spring similar to spring 142 in FIG. 2. In FIG. 3, an outer end of spring 166 is coupled to bar 160 via a ring 167, and the coil of spring 166 is mounted on a fixed component (not shown) such as an upright beam. Bar 160 is allowed to rotate freely within ring 167 without rotating the end of spring 166.

While the embodiment of FIG. 3 shows a a single flat coil constant force spring, there can be other restoring-force mechanisms, such as a counterweight for example, or a combination of such restoring-force mechanisms in other embodiments. There can be a different number of springs and/or different types of springs known in the art in other embodiments.

For example, there could be a torsion spring (not shown) inside of bar 160. Due to the relationship between bar 160 and cables 162 and 164, bar 160 rotates as it is lowered or raised. One end of the torsion spring could be fixed to bar 160, and could rotate with bar 160 as bar 160 is lowered. The second end of the torsion spring could be fixed to a shuttle (not shown) traveling in a track on an upright beam (not shown). The second end of the torsion spring would move down with bar 160, but would not rotate with bar 160. The restoring force of the torsion spring could move the bar 160 and its attached cover back up to the original position.

Figure 4:
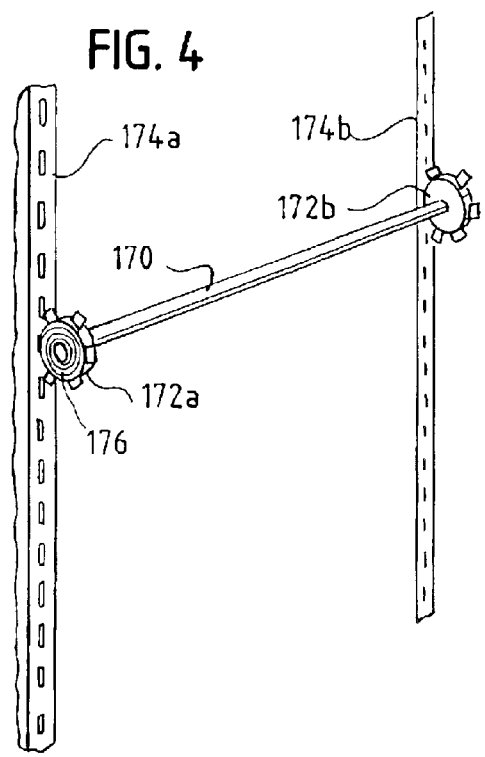
FIG. 4 is a sketch illustrating operation of another alternative embodiment.

FIG. 4 illustrates operation of another alternative embodiment. As in the embodiment of FIG. 1, a cover (not shown) could be attached to bar 170. However, instead of controlling the bar with cables, gears 172a and 172b at respective ends of bar 170 could ride up and down vertical racks 174a and 174b, respectively. Various retaining devices known in the art could be used to keep the bar 170 in the vertical plane of the racks 174a and 174b. For example, gears 172a and 172b could be trapped in a C-channel (not shown) in racks 174a and 174b, respectively. As other examples, another component such as a vertical pole could block bar 170 from leaving the vertical plane of the racks 174a and 174b, or the interconnecting relationship between the gear teeth and the racks 174a and 174b could serve that function.

A torsion spring 176 could supply the force to maintain the bar 170 at an initial position or restore it to that position after it is moved down. One end of the torsion spring 176 could be fixed to bar 170. If the bar 170 does not rotate with gears 172a and 172b, then a second end of torsion spring 176 could be fixed to gear 172a, for example. In another embodiment, one end of the torsion spring 176 could be fixed to gear 172a, for example, or to bar 170 if bar 170 rotates with gear 172a as bar 170 is moved down. The second end of the torsion spring 176 could be fixed to a shuttle (not shown) traveling in a track along rack 174a for example. The second end of the torsion spring 176 would move down with bar 170, but would not rotate with bar 170. In other embodiments, there can be a different number of springs, different types of springs, counterweights, and/or other restoring-force mechanisms known in the art.

In any of the embodiments, there can be a manual locking feature, as is known in the art, to keep the cover down. For example, the cover could be pulled down to allow access to a shelf. The locking feature, such as a bolt in a receptacle for example, could be engaged to keep the cover down while the shelf is being accessed. The locking feature then could be disengaged and the cover could automatically return to its original position.

Figure 6:
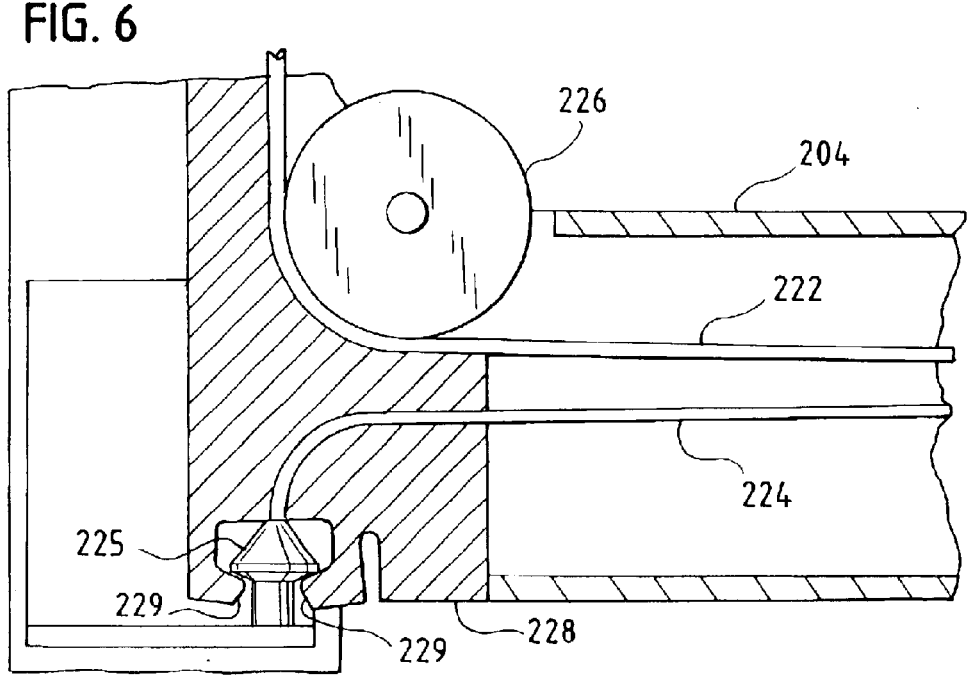
FIG. 6 is a sketch illustrating operation of one embodiment of an automatic locking feature, in the locked position.

FIG. 6 illustrates one embodiment of an automatic locking feature. In the embodiment of FIG. 6, the cover assembly can operate in a manner similar to the operation illustrated in FIG. 2. In FIG. 6, parts of cables 222 and 224 are located within bar 204. Pully 226 helps guide cable 222 near one end of bar 204, and fixed guide 228 helps guide cable 224 near that same end of bar 204.

In the embodiment of FIG. 6, the automatic locking feature is provided by a hook and protrusion combination. The end of bar 204 comprises a flexible hook 229. A protrusion 225 on cable 224 is located so that it will get trapped behind flexible hook 229 when bar 204 has been lowered to an appropriate stopping position. The hook and protrusion combination will provide sufficient resistance to the restoring force to keep the bar 204 down. However, when the bar 204 is pushed up enough to move protrusion 225 past flexible hook 229, the bar 204 will automatically return to its original position. In other embodiments, the hook and protrusion combination could be used in connection with a different cable and/or at a different location.

Figure 7:
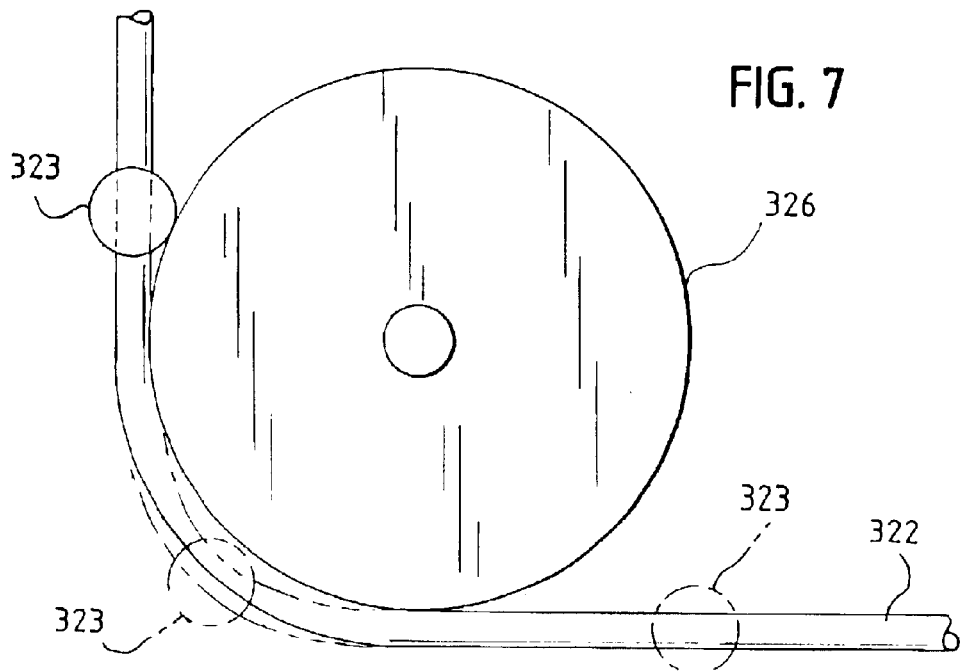
FIG. 7 is a sketch illustrating operation of another embodiment of an automatic locking feature.

FIG. 7 illustrates another embodiment of an automatic locking feature. In the embodiment of FIG. 7, the cover assembly can operate in a manner similar to the operation illustrated in FIG. 2. In FIG. 7, cable 322 rotates around pulley 326 as the cover assembly moves up or down. Protrusion 323 on cable 322 is shown on one side of pulley 326. Protrusion 323 is shown in phantom rotating around pulley 326, and on the other side of pulley 326.

Protrusion 323 is located on cable 322 so that it will get trapped on one side of pulley 326 when the cover assembly has been lowered to an appropriate stopping position. Protrusion 323 will provide sufficient resistance to the restoring force to keep cable 322 from rotating around pulley 326, and consequently to keep the cover assembly from moving back up to its original position. However, when the cover assembly is pushed up enough to move protrusion 323 around pulley 326, the cover assembly will automatically return to its original position. In different embodiments, the protrusion could be used with different cables and/or in connection with different pulleys.

Figure 8A:
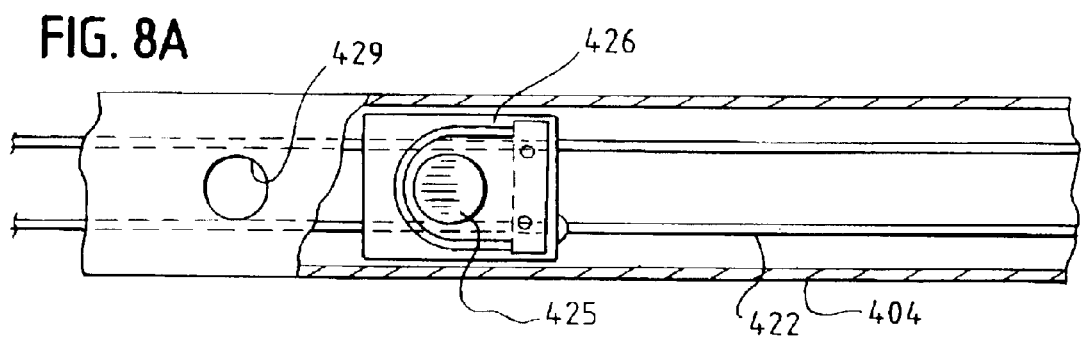
FIG. 8a is a sketch of a partial cut-away front view illustrating operation of another embodiment of an automatic locking feature, in the unlocked position.
Figure 8B:
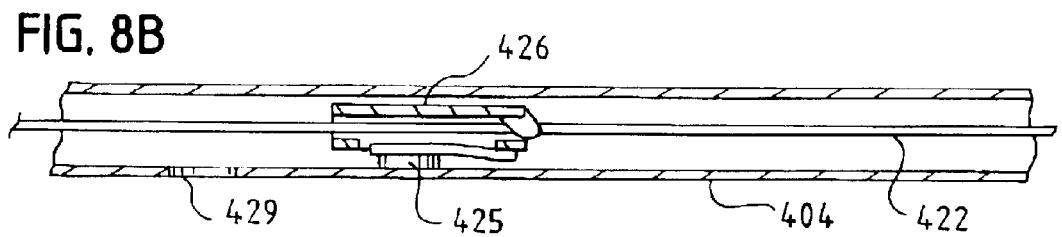
Figure 8C:
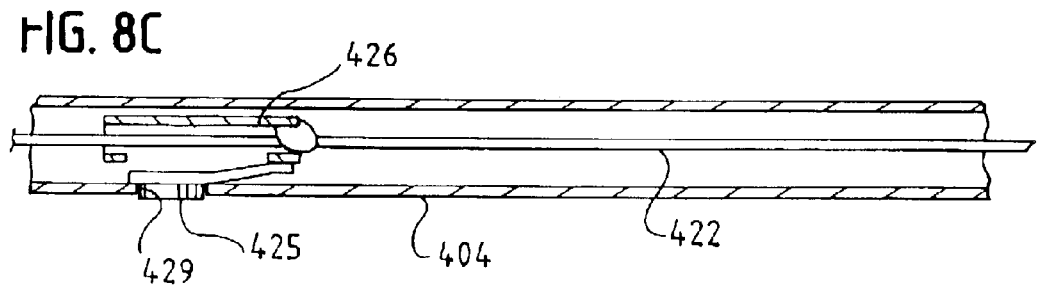
FIG. 8c is a sketch of a cut-away top view of the embodiment of FIG. 8a, but in the locked position.

FIGS. 8a through 8c illustrate another embodiment of an automatic locking feature. Similar to the operation illustrated in FIG. 2, in FIGS. 8a through 8c the cover assembly comprises a hollow bar 404 with a cable 422 extending through the inside of bar 404. A shuttle 426 is attached to cable 422, and carries a locking tab 425 which is biased to press against an interior surface of bar 404. Opening 429 is positioned in the front surface of bar 404 so that locking tab 425 will push into opening 429, when cable 422 has moved through bar 404 far enough for the cover assembly to be at an appropriate stopping position.

The locking tab 425 being trapped in opening 429 will provide sufficient resistance to the restoring force to keep cable 422 from moving back through the bar 404. Pressing in the locking tab 425 allows the restoring force to pull the cable 422 back through the bar 404, and the cover assembly will automatically return to its original position. In different embodiments, the locking tab and opening combination could be used in connection with a different cable and/or at a different location.

In one embodiment, a shuttle (such as shuttle 426 of FIGS. 8a through 8c) can be attached to a cable together with the end of a spring (such as spring 142 of FIG. 2).

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A cover assembly for use in connection with shelving structure, the cover assembly comprising:

a cover suitable for protecting against an object falling off of shelving;

a first cable;

a second cable;

cable guides;

a top end of the first cable fixedly mountable to a first side of the shelving structure;

a bottom end of the first cable fixedly mountable to a second side of the shelving structure;

a top end of the second cable fixedly mountable to the second side of the shelving structure;

a bottom end of the second cable fixedly mountable to the first side of the shelving structure;

the cable guides capable of directing the first cable to cross between the first and second sides of the shelving structure;

the cable guides capable of directing the second cable to cross between the first and second sides of the shelving structure;

the cover coupled to the cable guides; and wherein, without disconnection from the shelving structure, the cable guides and at least one edge of the coupled cover can be moved in a vertical direction from an original position to allow access to shelving behind the cover, and can be moved in an opposite vertical direction to restore the at least on edge of the cover to the original position.

2. The cover assembly as in claim 1, the cover comprising a net.

3. The cover assembly as in claim 1, further comprising:

a lateral cable;

ends of the lateral cable fixedly mountable to the shelving structure; and the cover coupled to the lateral cable.

4. The cover assembly as in claim 1, a first side of the cover slidingly coupled to th first cable; and a second side of the cover slidingly coupled to the second cable.

5. The cover assembly as in claim 1, the cable guides comprising first guides;

the cable guides further comprising second guides;

the cable guides further comprising a bar;

the cover coupled to the bar;

the first guides coupled to a first end of the bar;

the second guides coupled to a second end of the bar; and the cable guides capable of directing each of the first and second cables along the bar between the first guides and the second guides.

6. The cover assembly as in claim 1, the cable guides comprising a bar;

the bar surrounding a hollow interior; and the cable guides capable of directing the first a second cables through the hollow interior of the bar.

7. The cover assembly as in claim 1, the cable guides comprising two first guides;

the cable guides further comprising two second guides; and each of the two first guides and each of the two second guides selected from a group consisting of: a fixed guide and a pulley.

8. The cover assembly as in claim 1, further comprising a restoring force mechanism capable of automatically restoring the cover to the original position after the at least one edge of the cover has been moved from the original position.

9. The cover assembly as in claim 8, the restoring force mechanism comprising at least one spring.

10. The cover assembly as in claim 9,
a first end of the spring coupled to the cable guides; and
a second end of the spring capable of being coupled to one of the first and second cables.

11. The cover assembly as in claim 9, the at least one spring comprising a constant force spring.

12. The cover assembly as in claim 11,
the restoring force mechanism further comprising a shaft; and
the constant force spring comprising a tight coil of flat steel spring stock wound around the shaft.

13. The cover assembly as in claim 8,
the cable guides comprising a bar;
the bar surrounding a hollow interior;
the cable guides capable of directing the first and second cables through the hollow interior of the bar;
the restoring force mechanism comprising a shaft;
the shaft coupled to the bar;
the shaft allowed to turn freely about its axis;
the restoring force mechanism further comprising constant force spring;
the spring forming a coil around the shaft;
a first end of the spring coupled to the shaft;
a second end of the spring capable of being coupled to one of the first and second cables; and
wherein the spring can unwind and extend along the one of the first and second cables when the at least one edge of the cover is moved from the original position, and can automatically rewind to restore the at least one edge of the cover to the original position.

14. The cover assembly as in claim 13, wherein the spring can unwind and extend along the one of the first and second cables within the hollow interior of the bar.

15. The cover assembly as in claim 8, the restoring force mechanism comprising at least one counterweight.

16. The cover assembly as in claim 15, the at least one counterweight surroundable at least in part by a vertical beam of the shelving structure.

17. The cover assembly as in claim 15,
the restoring force mechanism further comprising a counterweight cable;
the restoring force mechanism further comprising cable redirection mechanism;
a first end of the counterweight cable coupled to the counterweight; and
a second end of the counterweight cable coupled to the cable guides.

18. The cover assembly as in claim 17, the cable redirection mechanism selected from a group consisting of: a fixed guide, a pulley, and a block and tackle.

19. The cover assembly as in claim 1, further comprising a locking mechanism capable of retaining the at least one edge of the cover in a second position.

20. The cover assembly as in claim 19, the locking mechanism comprising:
one of a protrusion and a receptacle;
the one of the protrusion and the receptacle coupled to the cable guides;
the one of the protrusion and the receptacle capable of cooperating with another of the protrusion and the receptacle, the other fixed to the shelving structure;
the one of the protrusion and the receptacle positioned to cooperate with the other when the at least one edge of the cover is in the second position.

21. The cover assembly as in claim 1, further comprising:
a locking mechanism capable of automatically retaining the at least one edge of the cover in a second position; and
a restoring force mechanism capable of automatically restoring the at least one edge of the cover to the original position after release of the locking mechanism.

22. The cover assembly as in claim 21,
an end of the cable guides comprising a flexible hook;
the locking mechanism comprising a protrusion;
the protrusion coupled to one of the first and second cables; and
the protrusion positioned to cooperate with the flexible hook when the at least one edge of the cover is in the second position.

23. The cover assembly as in claim 21,
the cable guides comprising a pulley;
the locking mechanism comprising a protrusion;
the protrusion coupled to one of the first and second cables; and
the protrusion positioned to cooperate with the pulley when the at least one edge of the cover is in the second position.

24. The cover assembly as in claim 21,
the cable guides comprising a bar;
the bar surrounding a hollow interior;
the cable guides capable of directing one of the first and second cables through the hollow interior of the bar;
the locking mechanism comprising a shuttle;
the shuttle capable of being coupled to the one of the first and second cables;
the shuttle comprising a locking tab;
the locking tab biased to press against an interior surface of the bar;
the bar defining an opening through the interior surface; and
the opening positioned to cooperate with the locking tab when the at least one edge of the cover is in the second position.

25. The cover assembly as in claim 24,
the restoring force mechanism comprising a spring; and
one end of the spring coupled to the shuttle.

26. The cover assembly as in claim 1, further comprising at least one counterweight capable of balancing the cover assembly when the cable guides are in any position.

* * * * *

UNITED STATES PATENT AND TRADEMARK OFFICE
CERTIFICATE OF CORRECTION

PATENT NO. : 6,805,187 B2
DATED : October 19, 2004
INVENTOR(S) : Padiak et al.

It is certified that error appears in the above-identified patent and that said Letters Patent is hereby corrected as shown below:

Column 6,
Line 22, delete "on", and insert therefor -- one --.
Line 33, delete "th", and insert therefor -- the --.
Line 52, delete "first a second", and insert therefor -- first and second --.

Column 7,
Lines 22 and 46, insert -- a -- after "comprising".

Signed and Sealed this

First Day of February, 2005

JON W. DUDAS
*Director of the United States Patent and Trademark Office*